US009515478B2

(12) United States Patent
Stepanek et al.

(10) Patent No.: US 9,515,478 B2
(45) Date of Patent: Dec. 6, 2016

(54) SYSTEM FOR PROTECTING OF A PLURALITY OF DC VOLTAGE SOURCES (71) Applicant: SCHNEIDER ELECTRIC INDUSTRIES SAS, Rueil-Malmaison (FR)

(72) Inventors: Jiri Stepanek, Echirolles (FR); Simon Tian, Eybens (FR); Eric Domejean, Voreppe (FR); Yvan Cadoux, Saint-Aupre (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 53 days.

(21) Appl. No.: 14/435,946

(22) PCT Filed: Oct. 17, 2013

(86) PCT No.: PCT/EP2013/071744
§ 371 (c)(1),
(2) Date: Apr. 15, 2015

(87) PCT Pub. No.: WO2014/060527
PCT Pub. Date: Apr. 24, 2014

(65) Prior Publication Data
US 2015/0288167 A1 Oct. 8, 2015

(30) Foreign Application Priority Data

Oct. 18, 2012 (FR) ...................................... 12 59950

(51) Int. Cl.
*H02H 3/00* (2006.01)
*H02H 3/16* (2006.01)
(Continued)

(52) U.S. Cl.
CPC ................. *H02H 3/16* (2013.01); *H02H 7/10* (2013.01); *H02H 7/20* (2013.01)

(58) Field of Classification Search
CPC ........................................................ H02H 3/16
(Continued)

(56) References Cited

U.S. PATENT DOCUMENTS

| 4,638,245 A | 1/1987 | MacPhee et al. |
| 7,035,065 B2 * | 4/2006 | McNally .................. H02H 3/16 361/42 |

(Continued)

FOREIGN PATENT DOCUMENTS

EP  2 463 977 A2  6/2012

OTHER PUBLICATIONS

International Search Report issued Jan. 27, 2014 in PCT/EP2013/071744 filed Oct. 17, 2013.

(Continued)

*Primary Examiner* — Stephen W Jackson
(74) *Attorney, Agent, or Firm* — Oblon, McClelland, Maier & Neustadt, L.L.P.

(57) ABSTRACT

A protection system configured to protect plural DC voltage sources configured to be connected in parallel between first and second input terminals of a voltage inverter. The voltage inverter can convert a DC input voltage into an AC output voltage. Each DC voltage source is connected by a first electrical conductor to the first input terminal and by a second electrical conductor to the second input terminal. The protection system includes: for each DC voltage source, a first cut-off member and first detector of a defect of isolation of the first conductor with respect to an electrical ground, the first detector and associated first cut-off member connected in series between the corresponding DC voltage source and the first input terminal of the inverter; and a mechanism triggering, in event of detection of the isolation defect, the associated first cut-off member to open the electrical link corresponding to the first conductor.

13 Claims, 6 Drawing Sheets (51) Int. Cl.
*H02H 7/10* (2006.01)
*H02H 7/20* (2006.01)

(58) Field of Classification Search
USPC .......................................................... 361/42
See application file for complete search history.

(56) References Cited

U.S. PATENT DOCUMENTS

| | | | |
|---|---|---|---|
| 7,746,604 B2* | 6/2010 | McNally | B60L 3/0023 361/103 |
| 8,958,182 B2* | 2/2015 | Luebke | H02H 1/0015 136/244 |
| 2012/0019964 A1 | 1/2012 | West | |
| 2012/0048325 A1 | 3/2012 | Matsuo et al. | |
| 2012/0175961 A1 | 7/2012 | Har-Shai et al. | |

OTHER PUBLICATIONS

Preliminary Search Report issued Jun. 11, 2013 in French Patent Application No. FR 12 59950 filed Oct. 18, 2012.

* cited by examiner

SYSTEM FOR PROTECTING OF A PLURALITY OF DC VOLTAGE SOURCES

The present invention relates to a system for protecting a plurality of DC voltage sources able to be connected in parallel between a first and second input terminal of a voltage inverter, the voltage inverter being able to convert a DC input voltage into an AC output voltage, each DC voltage source being connected by a first electrical conductor to the first input terminal and by a second electrical conductor to the second input terminal.

The invention also relates to a DC voltage production unit, comprising the voltage inverter, the plurality of DC voltage sources connected in parallel between the input terminals of the inverter, and such a protection system for the plurality of DC voltage sources.

The invention also relates to a method for protecting the plurality of DC voltage sources.

A production unit of the aforementioned type is known from document EP 1,291,997 A2. The production unit comprises a voltage inverter able to convert the DC voltage delivered by a solar cell field into an AC voltage supplied to a grid. The solar cell field forms a plurality of DC voltage sources connected in parallel and between the input terminals of the inverter.

The production unit also comprises a system for protecting the plurality of DC voltage sources, the protection system comprising a ground fault detector, i.e., a detector detecting an insulation fault of the electrical conductor relative to an electrical ground. If a ground fault is detected, the detector commands stoppage of the voltage inverter in order to isolate the DC voltage sources.

However, such a protection system causes a significant operating loss if a ground fault is detected, since the voltage inverter is stopped and the production unit no longer provides DC voltage to the grid.

The aim of the invention is therefore to propose a protection system making it possible to reduce operating losses in case of ground fault, i.e., in case of isolation fault of an electrical conductor relative to the electrical ground.

To that end, the invention relates to a protection system of the aforementioned type, characterized in that for each DC voltage source, it comprises a first cutoff member and a first detector of an isolation fault of the first conductor with respect to an electrical ground, the first detector and the associated first cutoff member being connected in series between the corresponding DC voltage source and the first input terminal of the inverter, and in that it comprises means for triggering the associated first cutoff member in case the isolation fault is detected, in order to open the electrical link corresponding to said first conductor.

According to other advantageous aspects of the invention, the protection system comprises one or more of the following features, considered alone or according to all technically possible combinations:

the system further comprises a first generator for generating a first predetermined reference signal, the first generator being able to be connected between the electrical ground and the first input terminal, the first reference signal having a non-zero predetermined frequency, and each first detector being able to detect the first reference signal for fault detection, the first reference signal being able to flow between the first corresponding detector and the first generator via the electrical ground in case of isolation fault;

the system further comprises, for each DC voltage source, a second cutoff member and a second detector for detecting an isolation fault of the second conductor relative to the electrical ground, the second detector and the associated second cutoff member being connected in series between the corresponding DC voltage source and the second input terminal of the inverter, and the system comprises means for triggering the second associated cutoff member if the isolation fault is detected, in order to open the corresponding electrical link to said second conductor;

the system further comprises a second generator of a second predetermined reference signal, the second generator being able to be connected between the electrical ground and the second input terminal, the second reference signal having a non-zero predetermined frequency, and each second detector is able to detect the second reference signal for fault detection, the second reference signal being able to flow between the second corresponding detector and the second generator via the electrical ground in case of an isolation fault;

the system comprises an auxiliary apparatus for each DC voltage source, each auxiliary apparatus comprising a protective housing, the first detector and the second detector, the detectors being positioned in the protective housing;

the first detector comprises a first DC current sensor able to measure the intensity of the DC current flowing in the first electrical conductor, the second detector comprises a second DC sensor able to measure the intensity of the DC current flowing in the second electrical conductor, and the auxiliary apparatus further comprises an electrical transformer to measure the sum of the current flowing in both electrical conductors;

each detector comprises a current sensor, such as a shunt, able to measure the intensity of the current flowing in the corresponding electrical conductors;

each detector comprises a high-pass filter, in order to eliminate the DC component from the measured voltage;

each detector comprises a computation member able to compute the intensity of a DC current and the intensity of a reverse current from the intensity measured by the current sensor; and the system further comprises a device for centralizing the detected faults, the centralizing device being able to communicate with each detector and, if one or more isolation faults are detected, to send a triggering signal to the corresponding cutoff member(s) (36, 38).

The invention also relates to a DC voltage production unit, comprising:
a voltage inverter, able to convert an input DC voltage into an AC voltage, the AC voltage having at least one phase, the inverter comprising an output terminal for the or each phase, and a first and second input terminal,
a plurality of DC voltage sources connected in parallel across the two input terminals of the inverter, each DC voltage source being connected by a first electrical conductor to the first input terminal and by a second electrical conductor to the second input terminal, and
a protection system for protecting the plurality of DC voltage sources,
characterized in that the protection system is as defined above.

According to another advantageous aspect of the invention, each DC voltage source comprises at least one photovoltaic panel.

The invention also relates to a method for protecting a plurality of DC voltage sources to be connected in parallel between a first and second input terminal of the voltage inverter, the voltage inverter being able to convert a DC input voltage into an AC output voltage, each DC voltage source being connected by a first electrical conductor to the first input terminal and by a second electrical conductor to the second input terminal, the protection method comprising the following steps:
detecting by the first isolation fault detector a first isolation fault of the first conductor relative to an electrical ground, and
triggering, in case a first isolation fault is detected relative to the electrical ground, a first associated cutoff member in order to open the corresponding electrical link to said first conductor, the first detector and the associated first cutoff member being connected in series between the corresponding DC voltage source and the first input terminal of the inverter.

According to other advantageous aspects of the invention, the protection method comprises one or more of the following features, considered alone or according to all technically possible combinations:

the protection method further comprises the following steps:
detecting by using a second isolation fault detector a second isolation fault of the second conductor relative to the electrical ground, and
triggering, in case the second isolation fault is detected relative to the electrical ground, an associated second cutoff member in order to open the corresponding electrical link to said second conductor, the second detector and the associated second cutoff member being connected in series between the corresponding DC voltage source and the second input terminal of the inverter; and
during the triggering step of the second cutoff member in case a second isolation fault is detected relative to the electrical ground, the triggering of the second cutoff member is commanded simultaneously with the triggering of the first cutoff member, preferably to within 20 ms, in order to have simultaneous opening of the first and second cutoff members, preferably to within 20 ms.

These features and advantages of the invention will appear upon reading the following description, provided solely as a non-limiting example, and done in reference to the appended drawings, in which.

Figure 1:
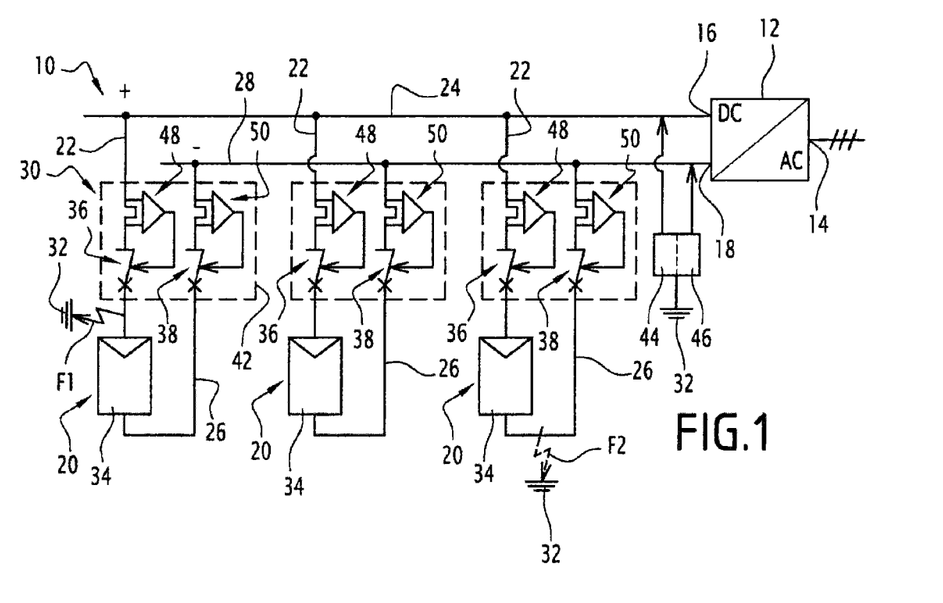
FIG. 1 is a diagrammatic illustration of a production unit for producing an AC voltage according to a first embodiment of the invention, the unit comprising a voltage inverter, a plurality of DC voltage sources connected in parallel and between the input terminals of the converter, and a protection system for the cutoff member and a first detector for detecting an isolation fault of the first conductor relative to an electrical ground, the first detector and the associated first cutoff member being connected in series between the corresponding DC voltage source and the first input terminal of the inverter.

In FIG. 1, a unit 10 for producing an AC voltage comprises a voltage inverter 12 able to convert a DC input voltage into the AC voltage, the AC voltage having at least one phase and the inverter 12 comprising an output terminal 14 for the or each phase, as well as a first input terminal 16 and a second input terminal 18.

The production unit 10 also comprises a plurality of DC voltage sources 20 connected in parallel between the two input terminals 16, 18 of the inverter.

The production unit 10 comprises a plurality of first electrical conductors 22 further linking each respective DC voltage source 20 with the first input terminal 16, the first conductors 22 being electrically linked to each other and to the first input terminal 16 by a first electrical line 24.

The production unit 10 also comprises a plurality of second electrical conductors 26 for linking each respective DC voltage source 20 with the second input terminal 18, the second electrical conductors 26 being electrically connected to each other and the second input terminal 18 by a second electrical line 28.

The production unit 10 also comprises a system 30 for protecting the plurality of DC voltage sources 20, in particular with respect to an isolation fault of one or more electrical conductors from among the first and second electrical conductors 22, 26 relative to an electrical ground 32.

In the example embodiment of FIG. 1, the AC voltage delivered by the inverter 12 is a three-phase voltage, and the inverter 12 then comprises three output terminals 14.

The voltage inverter 12 is known in itself, and comprises controllable electronic switches, not shown, the electronic switches being switched according to a control channel in order to convert the input DC voltage into a three-phase output voltage.

In the example embodiment of FIG. 1, the first input terminal 16 corresponds to the positive polarity of the DC input voltage, and is also called positive input terminal. The second input terminal 18 corresponds to the negative polarity of the DC input voltage, and is also called negative input terminal.

Each DC voltage source 20 is connected by a first respective conductor 22 to the first input terminal 16 and by a second respective conductor 26 to the second input terminal 18. Each DC voltage source 20 comprises at least one photovoltaic panel 34. In the example embodiment of FIG. 1, each DC voltage source 20 comprises a photovoltaic panel 34.

In an alternative that is not shown, each DC voltage source 20 comprises a plurality of photovoltaic panels 34 connected in series or in parallel between the input terminals 16, 18.

In the example embodiment of FIG. 1, the first electrical conductors 22 and the first [electrical] line 24 correspond to the positive polarity of the DC voltage, the first line 24 also being called positive line. The second electrical conductors 26 and the second electrical line 28 correspond to the negative polarity of the DC voltage supplied at the input of the inverter 12, and the second electrical line 28 is also called negative line.

Figure 2:
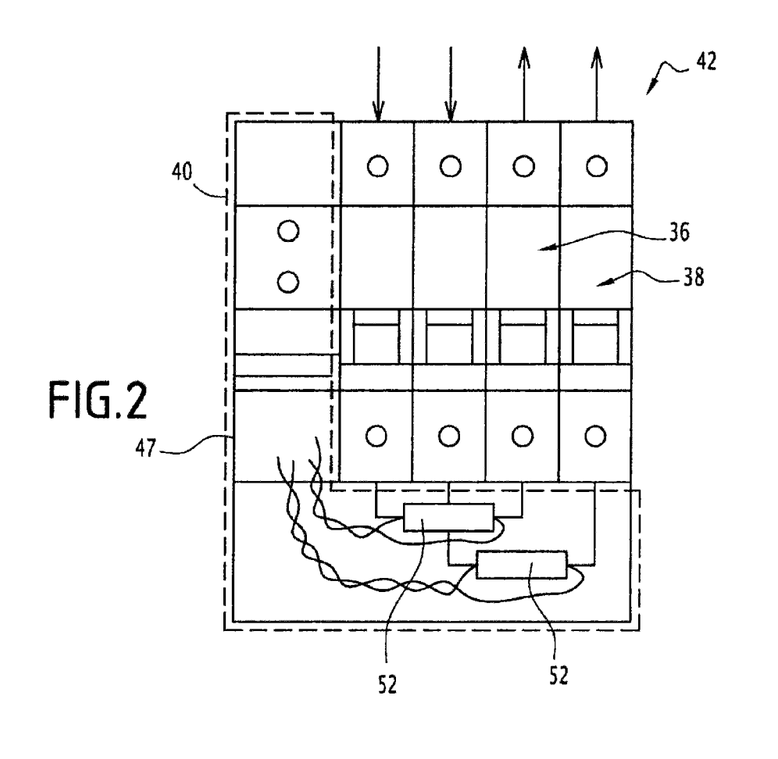
FIG. 2 is a diagrammatic illustration of a protection device of FIG. 1, the protection device comprising a first and second isolation fault detector.

For each DC voltage source 20, the protection system 30 comprises a first electrical cutoff member 36 connected to the corresponding first conductor 22, a second electrical cutoff member 38 connected to the corresponding second conductor 26 and an auxiliary apparatus 40 associated with the first and second cutoff members 36, 38. The first cutoff member 36, the second cutoff member 38 and the auxiliary apparatus 40 form a device 42 for protecting the corresponding DC voltage source 20, as shown in FIGS. 1 and 2.

In the example embodiment of FIG. 1, the protection system 30 comprises a corresponding protection device 42 for each DC voltage source 20.

The protection system 30 comprises a first generator 44 of a first predetermined reference signal. Additionally, the protection system 30 comprises a second generator 46 generating a second predetermined reference signal.

Each first cutoff member 36 and each second cutoff member 38 are for example circuit breakers, such as magnetothermal circuit breakers. In the example embodiment of FIG. 2, the first and second cutoff members 38 of a same protection device 42 are formed by a four-pole circuit breaker, each cutoff member 36, 38 corresponding to two poles of the circuit breaker. In this example embodiment, the first cutoff member 36 and the second cutoff member 38 are mechanically coupled by a triggering bar, not shown, in order to allow simultaneous opening of the first and second cutoff members 36, 38.

Each auxiliary apparatus 40 comprises a protective housing 47 and a first detector 48 detecting an isolation fault of the corresponding first conductor 22 with respect to the electrical ground 32, the first detector 48 being positioned in the protective housing 47.

Additionally, each auxiliary apparatus 40 comprises a second detector 50 detecting an isolation fault of the corresponding second conductor 26 with respect to the electrical ground 32, the second detector 50 being positioned in the protective housing 47.

The first generator 44 is connected between the electrical ground 32 and the first input terminal 16, in order to inject the first reference signal on the first electrical line 24. The first reference signal has a non-zero predetermined frequency, for example equal to 2.5 Hz, so as not to be combined with the DC current flowing in the first electrical line 24 and in the first conductors 22.

The second generator 46 is connected between the electrical ground 32 and the second input terminal 18, in order to inject the second reference signal on the second electrical line 28. The second reference signal has a non-zero predetermined frequency, for example equal to 2.5 Hz, so as not to be combined with the DC current flowing in the second electrical line 28 and in the second electrical conductor 26.

In an alternative that is not shown, the protection system 30 comprises a single generator among the first and second generators 44, 46, the reference signal injected on one of the lines among the first and second electrical lines 24, 28 being able to return to the other line among the first and second electrical lines 24, 28 through impedance coupling between the first and second electrical lines 24, 28. The impedance coupling of the first and second electrical lines 24, 28 is for example done via the voltage inverter 12.

The associated first detector 48 and first circuit breaker 36 are connected in series between the corresponding DC voltage source 20 and the first input terminal 16 of the inverter.

The first detector 48 is able to detect the first reference signal in order to detect an isolation fault, the first reference signal flowing between the corresponding first detector 48 and the first generator 44 via the electrical ground 32 in case of an isolation fault (arrow F1).

The associated second detector 50 and second circuit breaker 38 are connected in series between the corresponding DC voltage source 20 and the second input terminal 18 of the inverter.

The second detector 50 is able to detect the second reference signal in order to detect an isolation fault, the second reference signal flowing between the second detector 50 and the second generator 46 via the electrical ground 32 in case of an isolation fault on a corresponding second conductor 26 (arrow F2).

Figure 3:
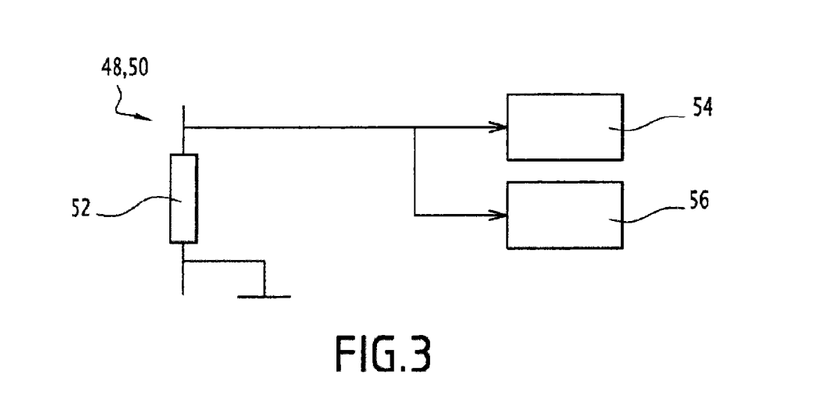
FIG. 3 is a diagrammatic illustration of each isolation fault detector of FIG. 2, the detector comprising a current sensor connected on the one hand to a reference signal detection stage, and on the other hand to a member for computing a DC current and a reverse current.

Each detector 48, 50 comprises a current sensor 52 able to measure the intensity of the current flowing in the corresponding electrical conductor 22, 26, a stage 54 for detecting the first or second reference signal and a member 56 for calculating a DC current and a reverse current, as shown in FIG. 3.

Figure 4:
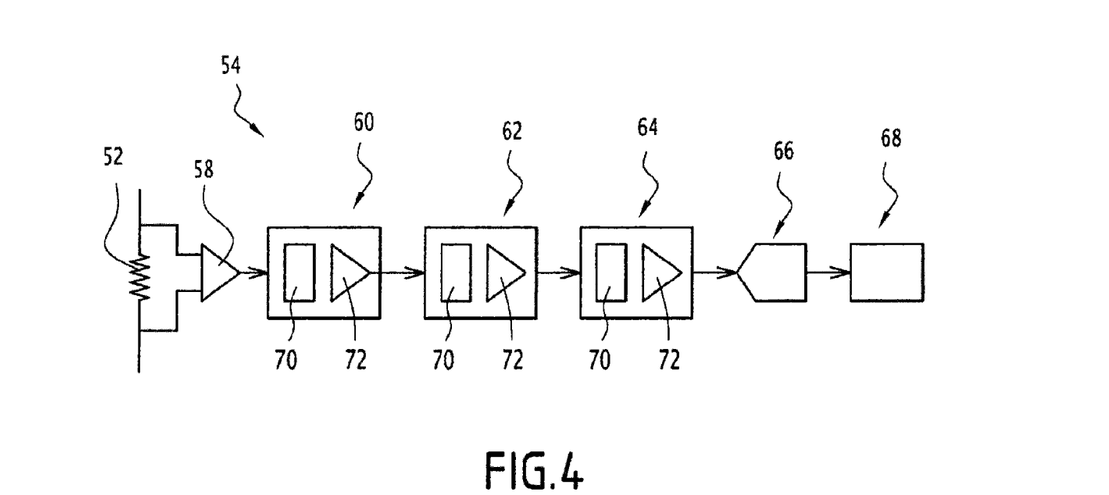
FIG. 4 is a diagrammatic illustration of the detection stage of FIG. 3.

In the example embodiment of FIGS. 2 to 4, the current sensor 52 is a shunt.

In the described embodiment, each detector 48, 50 is able to trigger the associated cutoff member 36, 38 if said detector detects an isolation fault of a corresponding conductor 22, 26 relative to the electrical ground 32. In other words, the first detector 48 forms triggering means for the first associated circuit breaker 36 if an isolation fault is detected of the corresponding first conductor 22 relative to the electrical ground 32. Similarly, the second detector 50 forms means for triggering the associated second circuit breaker 38, if an isolation fault of the corresponding second conductor 26 is detected relative to the electrical ground 32.

The detection stage 54, shown in FIG. 4, is connected to the ends of the current sensor 52. It comprises a differential amplifier 58, first 60, second 62 and third 64 filtering stages, connected in series at the output of the differential amplifier 58, an analog-digital converter 66 connected at the output of the third filtering stage 64 and a noise reducer 68 connected at the output of the digital analog converter 66. The detection stage 54 can detect an AC current, namely the first and/or second reference signal.

In an alternative that is not shown, the outputs of the differential amplifiers 58 of the two detectors 48, 50 are added together. This makes it possible to add the measuring signals coming from both current sensors 52 and to increase the signal-to-noise ratio when the measuring signals coming from the current sensors have a low value.

The computation member 56 is known in itself, and is able to compute the intensity of the DC current from the intensity measured by the current sensor 52. The computation member 56 is also able to compute the intensity of the reverse current, from the intensity measured by the current sensor 52, the reverse current being able to appear if a double isolation fault exists with respect to the electrical ground 52, i.e., an isolation fault of a first conductor 22 for a given DC source followed quasi-simultaneously by a fault for a second conductor 26 with respect to the electrical ground 32 for another DC voltage source.

Each filtering stage 60, 62, 64 comprises a high-pass filter 70 and a low-pass filter 72 connected at the output of the high-pass filter 70.

The high-pass filter 70 is designed to eliminate the DC component of the measured intensity. The high-pass filter 70 has a first cutoff frequency, preferably with a value below 1 Hz, in order to eliminate the DC component while keeping the first or second reference frequency signal for example equal to 2.5 Hz. The first cutoff frequency of the high-pass filter 70 is lower than the frequency of the first or second reference signal.

The low-pass filter 72 connected at the output of the high-pass filter 70 is designed to eliminate the frequency components higher than that of the first or second reference signal, in order to be able to detect that signal in case of an isolation fault. The high-pass filter 72 has a second cutoff frequency, for example with a value equal to 10 Hz, the frequency of the first or second reference signal for example being equal to 2.5 Hz. The second cutoff frequency of the low-pass filter 72 is higher than the frequency of the first or second reference signal, in order to preserve said reference signal.

In other words, each filtering stage 60, 62, 64 forms a band-pass filter in order to essentially preserve the frequencies comprised between the first cutoff frequency and the second cutoff frequency, i.e., the information corresponding to the first or second reference signal.

Each filtering stage 60, 62, 64 further has a significant gain, the set of the three filtering stages 60, 62, 64 having a total gain of more than 1000, preferably equal to 100,000.

The operation of the protection system 30 according to the invention will now be explained using FIGS. 5 and 6.

Figure 5:
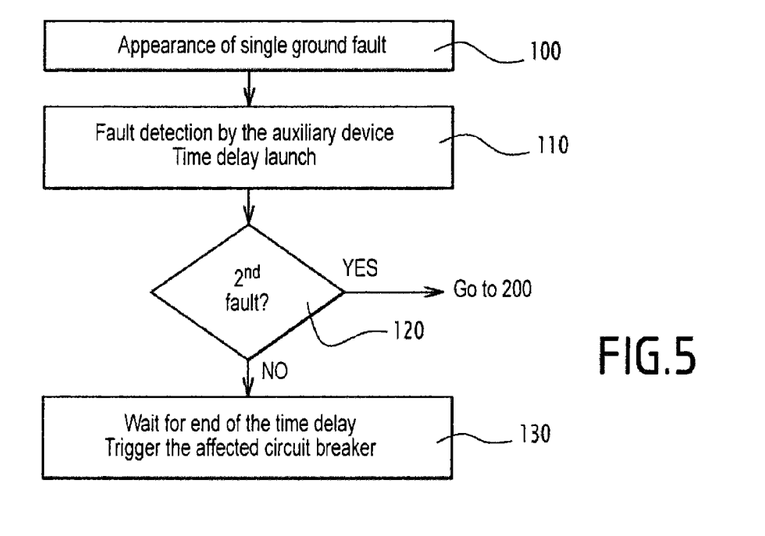
FIG. 5 is an operating flowchart of the protection system when a first ground fault appears.

In FIG. 5, in the event a first isolation fault of an electrical conductor 22, 26 appears with respect to the electrical ground 32 (step 100), the first or second reference signal, depending on whether the conductor experiencing the isolation fault is the first conductor 22 or the second conductor 26, flows in the faulty loop. The first or second reference signal is then detected by the corresponding detector 48, 50 of the auxiliary apparatus during step 110. The detector 48, 50 having detected the isolation fault then launches a time delay or validation delay for the fault.

If the second fault does not appear during the time delay during step 120, then the detector 48, 50 having previously detected the fault triggers the affected cutoff member 36, 38 at the end of the time delay during step 130.

In the described embodiment, the four-pole circuit breaker corresponding to the cutoff member 36, 38 in question is triggered in that case by the detector 48, 50 having previously detected the fault. In other words, the first and second cutoff members 36, 38 corresponding to the DC voltage source 20 affected by the isolation fault are then triggered.

The affected DC voltage source 20 is then isolated from the rest of the production unit 10 by opening the first and second corresponding cutoff members 36, 38. The production unit 10 is then once again operational without needing to stop the inverter 12, and while continuing to produce the AC voltage using the inverter 12 and other DC voltage sources 20 that are not experiencing a fault.

If, on the contrary, a second fault appears during the time delay during step 120, then the appearance of that second ground fault (step 200) causes the appearance of a reverse current and/or a current difference between the positive polarity and the negative polarity (step 210). The reverse current is a current flowing from the first fault (arrow F1) to the second fault (direction opposite that of arrow F2) via the electrical ground 32. Such a reverse current is generally significant, since it is only limited by the impedance of the first and second faults and by the resistance of the electrical ground 32.

This reverse current and/or this current difference between the two polarities is then detected during step 220 by the computation member 56 of the corresponding auxiliary apparatus 40. The affected detector 48, 50 launches a time delay.

During the following step 230, if the reverse current is determined for the two phases of a same auxiliary apparatus 40, then the two isolation faults are eliminated during step 240 via triggering of the first and second cutoff members 36, 38 associated with that auxiliary apparatus 40, i.e., in the described embodiment, via triggering of the four-pole circuit breaker associated with that auxiliary apparatus 40.

In the described example embodiment, where the first and second cutoff members 36, 38 are magnetothermal circuit breakers, if the intensity of the reverse fault current is less than 0.7 times the nominal intensity of the corresponding circuit breaker, denoted In, then the circuit breakers 36, 38 remain closed. If the intensity of the reverse fault current is comprised between 0.7 times In and 3.2 times In for curve B of the circuit breaker, then the auxiliary apparatus 40 will trigger the two circuit breakers 36, 38 in a time period comprised between 20 ms and 30 ms. If the intensity of the reverse fault current is comprised between 3.2 times In and 7 times In, this corresponds to an operating zone in which both the auxiliary apparatus 40 and the magnetic circuit of the affected circuit breaker 36, 38 may command triggering of the circuit breaker 36, 38. In any case, the time period necessary for triggering will be comprised between 10 ms and 30 ms, which makes it possible to have quasi-simultaneous opening of both circuit breakers 36, 38 associated with the double fault. Lastly, if the intensity of the reverse fault current is greater than 7 times In, then the magnetic circuits of the two circuit breakers 36, 38 will command the triggering of the circuit breakers 36, 38. The time period necessary for triggering will be shorter than 12 ms, which makes it possible to have better simultaneity of the opening of the two circuit breakers 36, 38 associated with the double fault.

If, on the contrary, the reverse current is determined between the positive and negative polarities of two different auxiliary apparatuses 40, then the first and second cutoff members 36, 38 of the affected two auxiliary apparatuses 40 are triggered at the end of the time delay during step 250. Said time delay is preferably shorter than 20 ms.

In the described embodiment, the two four-pole circuit breakers corresponding to the two affected auxiliary apparatuses 40 are in that case triggered by the detectors 48, 50 having previously detected those two faults. In other words, the double fault is eliminated via triggering of the two four-pole circuit breakers associated with the two affected auxiliary apparatuses 40.

The conditions for triggering the first and second magnetothermal circuit breakers 36, 38 and the time period necessary for the corresponding triggering are identical to those described above for step 240.

The two four-pole circuit breakers have a triggering curve managed electronically and therefore allow very good precision and reproducibility of the triggering. The two four-pole circuit breakers will therefore perform simultaneous or quasi-simultaneous opening. As a result, the cut voltage will be distributed across the contacts of the two four-pole circuit breakers. For a DC voltage U at the input of the inverter 12, each circuit breaker contact 36, 38 will be required to cut a voltage equal only to U/2. The voltage U at the input of the inverter 12 is for example equal to 1 kV, and the voltage to be cut by each circuit breaker 36, 38 is then equal to 500 V. This makes it possible to use less expensive circuit breakers 36, 38.

The two affected DC voltage sources 20 are therefore isolated from the rest of the production unit 10 by opening the first and second corresponding cutoff members 36, 38.

Thus, even in case of a double isolation fault of different conductors relative to the electrical ground 32, the voltage inverter 12 is not stopped, and only the DC voltage sources 20 having an isolation fault at their ends are isolated from the rest of the production unit 10, while the other DC voltage sources 20 that do not have a fault remain operational. This makes it possible to locate the isolation fault and continue producing AC voltage via the voltage inverter 12.

The protection system 30 according to the invention makes it possible to protect the DC voltage sources 20, i.e., to protect the photovoltaic panels 34 and the electrical connections linking the panels 34 to the cutoff members 36, 38. The protection system 30 protects the DC voltage sources 20 in particular from an electrical connection fault between a panel 34 and a cutoff member 36, 38, with respect to a fault between the inside of the panel 34 and the electrical ground 32 or with respect to a fault between an electrical connection of a panel 34 to a corresponding cutoff member 36, 38 and the electrical ground 32.

Figure 7:
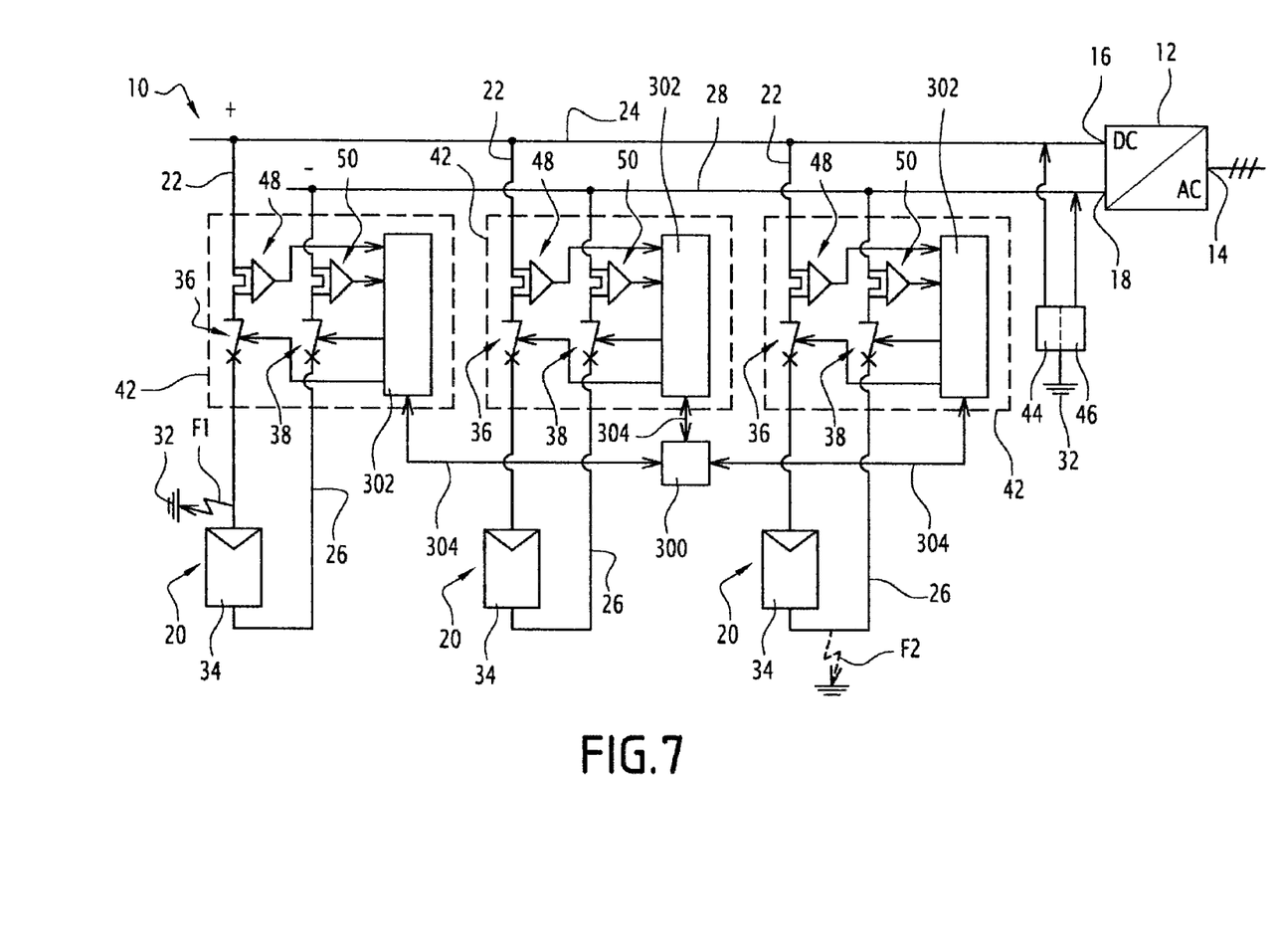
FIG. 7 is a view similar to that of FIG. 1, according to a second embodiment of the invention.
Figure 8:
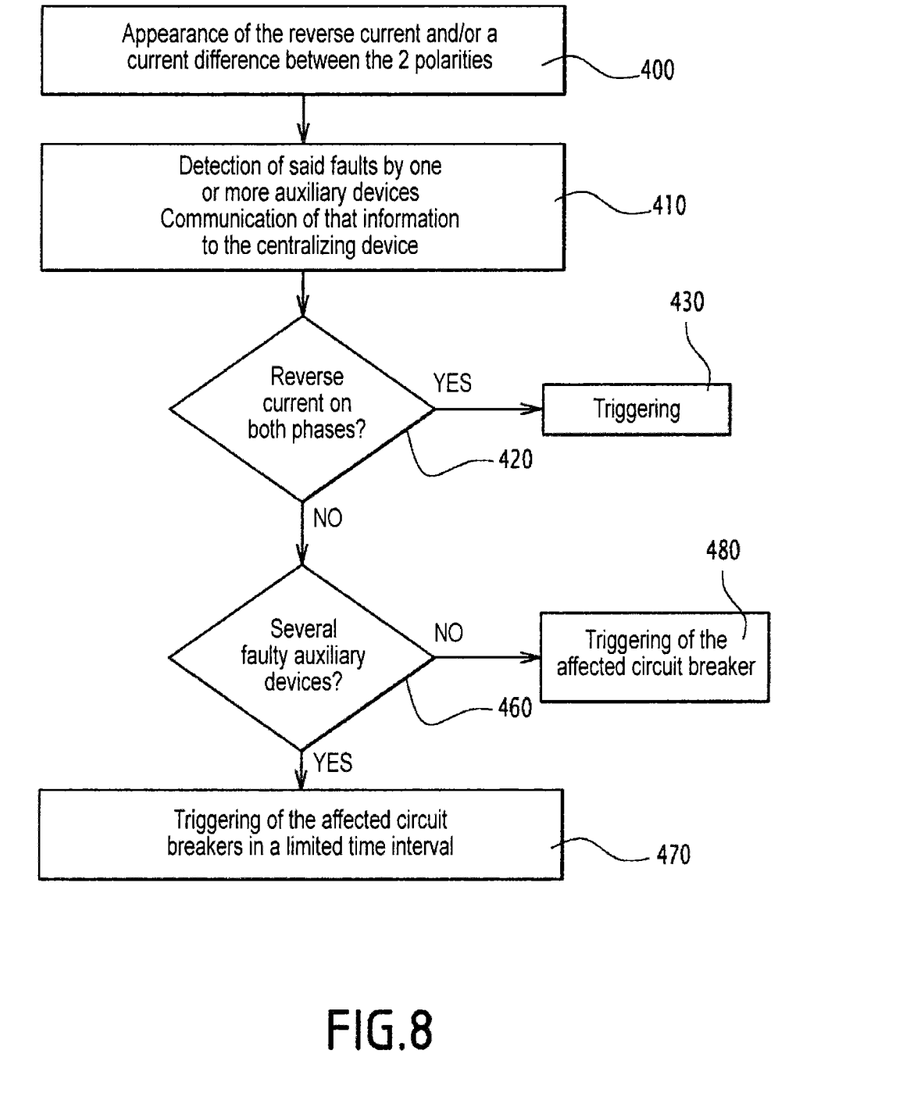
FIG. 8 is an operating flowchart of the protection system according to the second embodiment upon appearance of a reverse current and a current difference between the two polarities of the DC current at the input of the inverter.

FIGS. 7 and 8 illustrate a second embodiment of the invention, for which the elements similar to the first embodiment, previously described, are identified using identical references, and are not described again.

According to the second embodiment, the protection system 30 further comprises a device 300 for centralizing the detected faults, the centralizing device 300 being able to communicate with each detector 48, 50 and send a triggering signal to the corresponding cutoff member(s) 36, 38 if one or more isolation faults are detected.

In other words, according to the second embodiment, the centralizing device 300 forms means for triggering the affected first cutoff member 36 if the isolation fault of a corresponding first conductor 22 is detected relative to the electrical ground 32. Additionally, the centralizing device 300 forms means for triggering the second affected cutoff member 38 if an isolation fault of a corresponding second conductor 28 is detected relative to the electrical ground 32.

In the example embodiment of FIG. 7, the protection device 42 associated with each DC voltage source 20 further comprises a communication member 302, connected both to the first detector 48 and the second detector 50, the communication member 302 being shared by both detectors 48, 50 and able to allow the communication of data between the detectors 48, 50 and the centralizing device 300, via a data link 304.

In an alternative that is not shown, for each detector 48, the protection system 30 comprises a first communication member communicating with the centralizing device 300, and for each second detector 50, a second communication device communicating with the centralizing device 300.

The data link 304 is preferably a wireless link. Alternatively, the data link 304 is a wired link.

The operation of the protection system 30 according to the second embodiment is similar to that of the first embodiment described above. The operation of the protection system 30 according to the second embodiment will further be specified in the case of a double isolation fault using the flowchart of FIG. 8.

In case of a double isolation fault relative to the electrical ground 32, a reverse current and/or a current difference between the positive and negative polarities appear during step 400.

These isolation faults are then detected by the detectors 48, 50 of one or more auxiliary apparatuses 40 during step 410. The isolation faults detected by the detectors 48, 50 are then communicated to the centralizing device 300 using the corresponding communication member(s) 302.

During the following step 420, the centralizing device 300 determines whether the determined reverse current is present on both phases of the same protection device 42, and if applicable, sends a triggering signal to the first and second cutoff members 36, 38 of the corresponding protection device 42 during step 430. In the described example embodiment, the four-pole circuit breaker corresponding to the first and second cutoff members 36, 38 of the protection device 42 is triggered. The triggering conditions for the first and second magnetothermal circuit breakers 36, 38 and the time period necessary for the corresponding triggering are identical to those previously described for the first embodiment in light of step 240 of FIG. 6.

Otherwise, during step 460, the centralizing device determines whether several auxiliary apparatuses 40 have each detected that isolation fault relative to the electrical ground 32.

During this step 460, if the detectors 48, 50 of a single auxiliary apparatus 40 have detected an isolation fault, then the first and second cutoff members 36, 38 associated with that auxiliary apparatus 40 are triggered during step 480. In the described example embodiment, only the four-pole circuit breaker associated with the corresponding auxiliary apparatus 40 is then triggered via the centralizing device 300.

Figure 6:
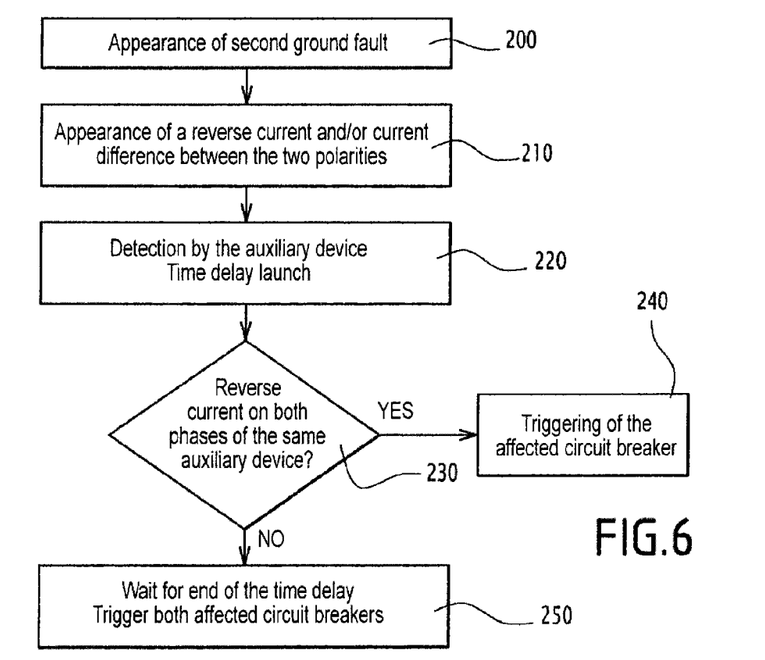
FIG. 6 is an operating flowchart of the protection system when a second ground fault appears.

The triggering conditions for the first and second magnetothermal circuit breakers 36, 38 and the time period necessary for the corresponding triggering are once again identical to those previously described for the first embodiment in light of step 240 of FIG. 6.

Otherwise, in the event several auxiliary apparatuses 40 have detected an isolation fault via their respective detectors 48, 50, then the first and second cutoff members 36, 38 associated with each of those auxiliary apparatuses 40 having detected an isolation fault are triggered by corresponding signals emitted by the centralizing device 300. In other words, in the described example embodiment, the four-pole circuit breakers associated with the auxiliary apparatuses 40 having detected the isolation fault are triggered, the triggering of the affected circuit breakers occurring in a limited time interval, for example a time interval of less than 20 ms.

The triggering conditions for the first and second magnetothermal circuit breakers 36, 38 and the time period necessary for the corresponding triggering are once again identical to those previously described for the first embodiment in light of step 240 of FIG. 6.

The two four-pole circuit breakers will therefore perform simultaneous or quasi-simultaneous opening. As a result, the cut voltage will be distributed across the contacts of the two four-pole circuit breakers. For a DC voltage U at the input of the inverter 12, each circuit breaker contact 36, 38 will be required to cut a voltage equal only to U/2.

At the end of the triggering of the affected circuit breakers, the DC voltage sources 20 having an isolation fault at their ends are then isolated from the rest of the production unit 10, such that the production unit 10 once again operates normally in order to deliver the AC voltage from the voltage inverter 12. The inverter 12 is powered at the input by the DC voltage sources 20 not having an isolation fault at their terminal and not having been isolated by the previous triggering of the affected circuit breakers.

The protection system 30 according to the second embodiment then makes it possible to offer better coordination of the triggering of the affected cutoff members 36, 38 following the appearance of one or more isolation faults. The protection system 30 according to the second embodiment in particular makes it possible to better control the time interval during which the sets of cutoff members 36, 38 are triggered in the case of several isolation faults relative to the electrical ground 32.

The other advantages of this second embodiment are identical to those of the first embodiment, and are not described again.

Figure 9:
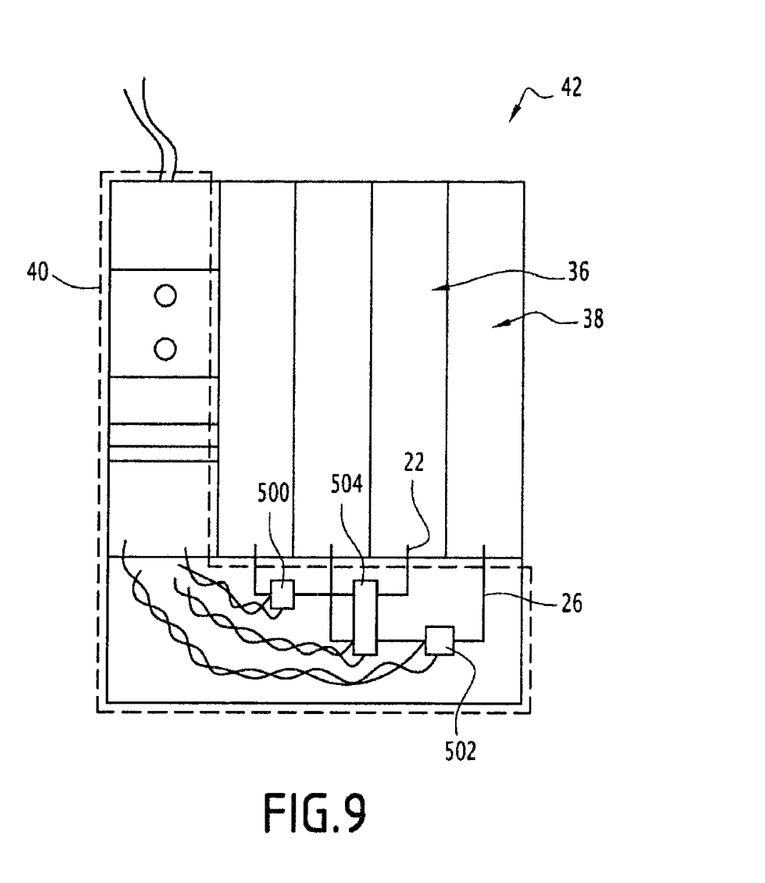
FIG. 9 is a view similar to that of FIG. 2 according to a third embodiment.

FIG. 9 illustrates a third embodiment of the invention, for which the elements similar to the first embodiment, previously described, are identified using identical references, and are not described again.

According to the third embodiment, the first detector 48 comprises a first DC current sensor 500 able to measure the intensity of the current flowing in the corresponding first electrical conductor 22. The second detector 50 comprises a second DC current sensor 502 able to measure the intensity of the DC current flowing in the corresponding second electrical conductor 26.

The auxiliary apparatus 40 further comprises an electrical transformer 504 for measuring the sum of the current flowing in the two electrical conductors 22, 26.

In other words, according to the third embodiment, each auxiliary apparatus 40 comprises the first DC current sensor 500, the second DC current sensor 502 and the electrical transformer 504, instead of the two current sensors 52, such as shunts, of the first and second embodiments.

The transformer 504 further makes it possible to detect the first reference signal and/or the second reference signal, the two DC current signals 500, 502 allowing the detection of the reverse current and/or the current difference between the positive and negative polarities.

The protection system 30 according to the third embodiment makes it possible to have current measurements that are less sensitive to noise than with the shunts 52 of the first and second embodiments. This measurement alternative for the current flowing in the first and second electrical conductors 22, 26 is, however, more expensive than that described using shunts for the first and second embodiments.

One can thus see that the protection system 30 according to the invention makes it possible to reduce the operating losses in case of an isolation fault of an electrical conductor 22, 26 relative to the electrical ground 32.

The invention claimed is:

1. A system for protecting a plurality of DC voltage sources configured to be connected in parallel between first and second input terminals of a voltage inverter, the voltage inverter configured to convert a DC input voltage into an AC output voltage, each DC voltage source being connected by a first electrical conductor to the first input terminal and by a second electrical conductor to the second input terminal, the protection system comprising:
    for each DC voltage source, a first cutoff member and a first detector of an isolation fault of the first conductor with respect to an electrical ground, the first detector and the associated first cutoff member being connected in series between the corresponding DC voltage source and the first input terminal of the inverter;
    means for triggering the associated first cutoff member in case the isolation fault is detected, to open the electrical link corresponding to the first conductor;
    for each DC voltage source, a second cutoff member and a second detector of an isolation fault of the second conductor with respect to the electrical ground, the second detector and the associated second cutoff member being connected in series between the corresponding DC voltage source and the first input terminal of the inverter; and
    means for triggering the associated second cutoff member in case the isolation fault is detected, to open the electrical link corresponding to the second conductor.

2. The system according to claim 1, further comprising a first generator for generating a first predetermined reference signal, the first generator configured to be connected between the electrical ground and the first input terminal, the first reference signal having a non-zero predetermined frequency, and
    wherein each first detector is configured to detect the first reference signal for fault detection, the first reference signal configured to flow between the first corresponding detector and the first generator via the electrical ground in case of isolation fault.

3. The system according to claim 1, further comprising a second generator of a second predetermined reference signal, the second generator configured to be connected between the electrical ground and the second input terminal, the second reference signal having a non-zero predetermined frequency, and
    wherein each second detector is configured to detect the second reference signal for fault detection, the second reference signal configured to flow between the second corresponding detector, and the second generator via the electrical ground in case of an isolation fault.

4. The system according to claim 1, further comprising an auxiliary apparatus for each DC voltage source, each auxiliary apparatus comprising a protective housing, the first detector, and the second detector, the detectors being positioned in the protective housing.

5. The system according to claim 4, wherein the first detector comprises a first DC current sensor configured to measure intensity of DC current flowing in the first electrical conductor, the second detector comprises a second DC sensor configured to measure intensity of DC current flowing in the second electrical conductor, and the auxiliary apparatus further comprises an electrical transformer to measure the sum of the current flowing in both electrical conductors.

6. The system according to claim 1, wherein each detector comprises a current sensor, or a shunt, configured to measure intensity of current flowing in the corresponding electrical conductors.

7. The system according to claim 5, wherein each detector comprises a high-pass filter, to eliminate a DC component from the measured voltage.

8. The system according to claim 5, wherein each detector comprises a computation member configured to compute intensity of a DC current and intensity of a reverse current from the intensity measured by the current sensor.

9. The system according to claim 1, further comprising a centralizing device for centralizing the detected faults, the centralizing device configured to communicate with each detector and, if one or more isolation faults are detected, to send a triggering signal to the corresponding cutoff member.

10. A DC voltage production unit, comprising:
a voltage inverter, configured to convert an input DC voltage into an AC voltage, the AC voltage having at least one phase, the inverter comprising an output terminal for the at least one phase, and first and second input terminals;
a plurality of DC voltage sources connected in parallel across the two input terminals of the inverter, each DC voltage source being connected by a first electrical conductor to the first input terminal and by a second electrical conductor to the second input terminal; and
a protection system according to claim 1 for protecting the plurality of DC voltage sources.

11. The unit according to claim 10, wherein each DC voltage source comprises at least one photovoltaic panel.

12. A method for protecting a plurality of DC voltage sources to be connected in parallel between first and second input terminals of a voltage inverter, the voltage inverter configured to convert a DC input voltage into an AC output voltage, each DC voltage source being connected by a first electrical conductor to the first input terminal and by a second electrical conductor to the second input terminal, the protection method comprising:
detecting, by using the first isolation fault detector, a first isolation fault of the first conductor relative to an electrical ground;
triggering, in case a first isolation fault is detected relative to the electrical ground, a first associated cutoff member to open the corresponding electrical link to the first conductor, the first detector and the associated first cutoff member being connected in series between the corresponding DC voltage source and the first input terminal of the inverter;
detecting, by using a second isolation fault detector, a second isolation fault of the second conductor relative to the electrical ground; and
triggering, in case the second isolation fault is detected relative to the electrical ground, an associated second cutoff member to open the corresponding electrical link to the second conductor, the second detector and the associated second cutoff member being connected in series between the corresponding DC voltage source and the second input terminal of the inverter.

13. The protection method according to claim 12, during the triggering of the second cutoff member in case a second isolation fault is detected relative to the electrical ground, the triggering of the second cutoff member is commanded simultaneously with the triggering of the first cutoff member, or within 20 ms, to have simultaneous opening of the first and second cutoff members, or within 20 ms.

* * * * *